(12) United States Patent
Kawabe et al.

(10) Patent No.: US 12,607,645 B2
(45) Date of Patent: Apr. 21, 2026

(54) AUTOMATIC ANALYSIS APPARATUS

(71) Applicant: SEKISUI MEDICAL CO., LTD.,
Tokyo (JP)

(72) Inventors: Toshiki Kawabe, Tokyo (JP);
Tomohisa Nishio, Tokyo (JP);
Hirotoshi Matsushita, Tokyo (JP);
Shota Takimori, Tokyo (JP); Toyomi Yamaguchi, Tokyo (JP)

(73) Assignee: SEKISUI MEDICAL CO., LTD.,
Tokyo (JP)

( * ) Notice: Subject to any disclaimer, the term of this patent is extended or adjusted under 35 U.S.C. 154(b) by 764 days.

(21) Appl. No.: 17/811,070

(22) Filed: Jul. 7, 2022

(65) Prior Publication Data

US 2022/0349911 A1     Nov. 3, 2022

Related U.S. Application Data

(63) Continuation of application No. PCT/JP2020/047101, filed on Dec. 17, 2020.

(30) Foreign Application Priority Data

Feb. 7, 2020     (JP) ................................. 2020-019676

(51) Int. Cl.
*G01N 35/10*      (2006.01)
*B01F 23/53*      (2022.01)
(Continued)

(52) U.S. Cl.
CPC ......... *G01N 35/1002* (2013.01); *B01F 23/53* (2022.01); *G01N 35/025* (2013.01);
(Continued)

(58) Field of Classification Search
None
See application file for complete search history.

(56) References Cited

U.S. PATENT DOCUMENTS 3,754,866 A * 8/1973 Ritchie ................ G01N 21/255
356/414
4,477,192 A 10/1984 Bonney
(Continued)

FOREIGN PATENT DOCUMENTS

| | | |
|---|---|---|
| CN | 103003701 A | 3/2013 |
| CN | 104849130 A | 8/2015 |

(Continued)

OTHER PUBLICATIONS

Lucas F. de Paula and Reinaldo Ruggiero, "Teaching Students How To Troubleshoot, Repair, and Maintain Magnetic Stirring Hot Plates Using Low-Cost Parts or Repurposed Materials", Journal of Chemical Education 2018 95 (11), 2050-2054 (Year: 2018).*

(Continued)

*Primary Examiner* — Neil N Turk
*Assistant Examiner* — Benjamin Joseph Kass
(74) *Attorney, Agent, or Firm* — HAUPTMAN HAM, LLP

(57)     ABSTRACT

An automatic analysis apparatus is capable of stirring a reagent without reducing the analysis processing capacity. The automatic analysis apparatus includes a reagent table that is rotatable and that holds reagent vessels, and a plurality of magnets are disposed below the reagent table, with orientations of magnetic poles of the magnets fixed, along a movement path of the reagent vessels moving on a circumference when the reagent table is rotationally driven. The plurality of magnets is disposed such that the fixed orientations of the magnetic poles of the magnets vary along the movement path, and act a magnetic force on a stirring bar in each of the reagent vessels. When the reagent table is rotated and the reagent vessels pass above the magnets, the stirring bar in each of the reagent vessels is rotated or (Continued)

oscillated by the magnetic force received from the magnets, to stir the reagent.

10 Claims, 4 Drawing Sheets

(51) Int. Cl.

| | |
|---|---|
| *G01N 1/28* | (2006.01) |
| *G01N 35/00* | (2006.01) |
| *G01N 35/02* | (2006.01) |
| *G01N 35/04* | (2006.01) |

(52) U.S. Cl.

CPC ......... *G01N 35/1016* (2013.01); *G01N 1/286* (2013.01); *G01N 2035/00534* (2013.01); *G01N 2035/0444* (2013.01)

(56) References Cited

U.S. PATENT DOCUMENTS

| | | | |
|---|---|---|---|
| 5,705,062 A | 1/1998 | Knobel | |
| 6,357,907 B1 * | 3/2002 | Cleveland ............. | B01F 33/452 366/273 |
| 2009/0196793 A1 | 8/2009 | Omuro et al. | |
| 2012/0318302 A1 * | 12/2012 | Nakayama ......... | G01N 35/1004 134/26 |
| 2013/0125671 A1 | 5/2013 | Sakashita et al. | |
| 2015/0104351 A1 | 4/2015 | Makino et al. | |
| 2017/0269113 A1 | 9/2017 | Makino et al. | |
| 2018/0326383 A1 | 11/2018 | Kotani et al. | |
| 2019/0346470 A1 | 11/2019 | Makino et al. | |
| 2022/0074959 A1 | 3/2022 | Makino et al. | |

FOREIGN PATENT DOCUMENTS

| | | | | |
|---|---|---|---|---|
| DE | 19543401 A1 | | 5/1997 | |
| GB | 1561582 A | | 2/1980 | |
| GB | 2576058 A | | 2/2020 | |
| JP | H4271823 A | | 9/1992 | |
| JP | H4296654 A | | 10/1992 | |
| JP | H04296654 A | * | 10/1992 | |
| JP | H5180849 A | | 7/1993 | |
| JP | 200046836 A | | 2/2000 | |
| JP | 2009210563 A | | 9/2009 | |
| JP | 2009270941 A | | 11/2009 | |
| JP | 2010032386 A | | 2/2010 | |
| JP | 2014126415 A | | 7/2014 | |
| JP | 2018192384 A | | 12/2018 | |
| JP | 201982419 A | | 5/2019 | |
| JP | 2019135497 A | | 8/2019 | |

OTHER PUBLICATIONS

Office Action in JP Application No. 2021-575643, mailed Mar. 3, 2023, 11pp.

Extended European Search Report in EP Application No. 20918005.8 dated Jan. 30, 2024, 11pp.

International Search Report and Written Opinion in PCT Application No. PCT/JP2020/047101, mailed Jan. 26, 2021, 9pp.

Office Action in CN Application No. 202080093702.2 dated Jan. 23, 2025, 16pp.

Office Action in CN Application No. 202080093702.2 dated Oct. 9, 2025, 17pp.

Office Action in CN Application No. 202080093702.2, issued Jul. 25, 2025, 17pp.

* cited by examiner

AUTOMATIC ANALYSIS APPARATUS

RELATED APPLICATIONS

The present application is a continuation of International Application No. PCT/JP2020/047101, filed Dec. 17, 2020, which claims priority from Japanese Patent Application No. 2020-019676, filed Feb. 7, 2020, the disclosures of which applications are hereby incorporated by reference here in their entirety.

TECHNICAL FIELD

The present invention relates to an automatic analysis apparatus capable of obtaining measurement information regarding various test items by causing a sample (specimen) such as blood or urine to react with various reagents to measure a reaction process thereof.

BACKGROUND ART

In the related art, various forms of automatic analysis apparatuses, such as a blood coagulation analysis device and an analysis apparatus using immunoassay, have been known which are capable of obtaining measurement information regarding various test items by causing a biological sample such as blood or urine to react with various reagents to measure reaction processes thereof. For example, a specimen as a sample is dispensed from a specimen vessel into a reaction vessel, a reagent corresponding to a test item is dispensed and mixed with the dispensed specimen, and various measurements and analyses are performed (for example, refer to Patent Document 1).

In such an automatic analysis apparatus, a reagent vessel containing the reagent dispensed to the specimen is held by a reagent supply portion, and in this case, the reagent supply portion generally includes a reagent table that is rotatable and that holds the reagent vessel, and a drive motor that rotationally drives the reagent table. Then, the reagent held in such a state by the reagent supply portion may need to be stirred to keep the concentration or the like of the reagent in the reagent vessel uniform.

As a stirring mechanism that performs such stirring, a type of stirring mechanism has been known which acts a magnetic force on a stirring bar disposed in the reagent vessel from the outside of the reagent vessel to rotate the stirring bar, thereby stirring the reagent (for example, refer to Patent Document 2). One example of such a stirring mechanism is illustrated in FIG. 4A and FIG. 4B. As illustrated, the stirring mechanism includes a stirring unit 150 including a magnet 130 that is rotatable, at a predetermined position below a reagent table 102 of a reagent supply portion 100 holding a reagent vessel 110, the reagent table 102 being rotatable, specifically, a predetermined position along a movement path of the reagent vessel 110 moving on a circumference when the reagent table 102 is rotationally driven (a position where a relative position can be aligned with, for example, a center of a bottom portion of the reagent vessel 110). The stirring unit 150 is located below the reagent table 102 and provided on a bottom surface 160 of a reagent chamber. Then, when the reagent is stirred, the reagent vessel 110 containing the reagent to be stirred is positioned above the stirring unit 150 as illustrated in FIG. 4A by rotating the reagent table 102 through driving a table rotation drive motor 142, the magnet 130 is rotated by driving a magnet rotation drive motor 144 in the positioning state, and a stirring bar 120 in the reagent vessel 110 is rotated by a magnetic action, to stir the reagent.

CITATION LIST

Patent Document

Patent Document 1: JP 2019-135497 A
Patent Document 2: JP 2018-192384 A

SUMMARY OF THE INVENTION

Problem to be Solved by the Invention

However, in such a stirring mechanism, in addition to the magnet and the stirring bar, a rotation mechanism that rotates the magnet is separately required. In addition, in order to stir the reagent, it is necessary to rotate the reagent table to position the reagent vessel above the stirring unit. The time for a stirring operation including such a positioning operation needs to be secured separately from the time for a reagent dispensing operation (it is necessary to allocate a stirring time as much as the number of reagents that need to be stirred), so that the operation cycle time is lengthened and the analysis processing capacity is reduced, which is a problem.

The invention is conceived in view of the above problem, and an object of the invention is to provide an automatic analysis apparatus capable of stirring a reagent without reducing the analysis processing capacity, with a simple configuration.

Means for Solving Problem

In order to achieve the above object, an automatic analysis apparatus of the invention including a reaction portion holding a reaction vessel where a specimen is dispensed, and a reagent supply portion to supply a reagent, to obtain measurement information regarding a predetermined test item by causing the reagent supplied from the reagent supply portion to react with the specimen to measure a reaction process of the reagent and the specimen, the apparatus including: a reagent table rotatably provided in the reagent supply portion, and holding reagent vessels each containing the reagent; a table rotation drive unit to rotationally drive the reagent table; and a controller to control operation of a drive unit of the automatic analysis apparatus including the table rotation drive unit. A plurality of holding portions individually holding the reagent vessels are provided in the reagent table at predetermined intervals along a circumferential direction of the reagent table so as to be concentric about a rotation axis of the reagent table. A plurality of magnets are disposed below the reagent table, with orientations of magnetic poles of the magnets fixed, along a movement path of the reagent vessels held by the holding portions and moving on a circumference when the reagent table is rotationally driven. The plurality of magnets are disposed such that the fixed orientations of the magnetic poles of the magnets vary along the movement path of the reagent vessels, and act a magnetic force on a stirring bar disposed in each of the reagent vessels and having magnetism. When the reagent table is rotated by the table rotation drive unit and the reagent vessels pass above the plurality of magnets, the stirring bar in each of the reagent vessels is rotated and/or oscillated by the magnetic force received from the magnets, to stir the reagent.

According to the automatic analysis apparatus with the above configuration, the plurality of magnets are disposed below the reagent table along the movement path of the reagent vessels moving on the circumference when the reagent table is rotationally driven, such that the orientations of the magnetic poles of the magnets vary along the movement path, and the reagent vessels pass above the plurality of magnets when the reagent table is rotationally driven, so that the stirring bar in each of the reagent vessels is rotated and/or oscillated by a magnetic force, to stir the reagent. Therefore, for example, the reagent can also be stirred at the same time as the rotation of the reagent table performed for a normal reagent dispensing operation. For this reason, it is not necessary to separately provide the stirring unit including the rotation mechanism that rotates the magnet as in the related art described above in relation to FIG. 4A and FIG. 4B, and in order to stir the reagent, it is also not necessary to rotate the reagent table to position the reagent vessel above the stirring unit. Therefore, since the reagent can be stirred during an analysis operation, with a simple configuration, and the time for stirring does not need to be secured separately from the time for the reagent dispensing operation, the analysis operation cycle time taken to stir the reagent is eliminated or is shortened, so that the analysis processing capacity can be improved.

Incidentally, in the above configuration, the plurality of holding portions individually holding the reagent vessels are provided concentrically about the rotation axis of the reagent table at the predetermined intervals along the circumferential direction of the reagent table, but the number of disposition circles of the holding portions disposed in a circular shape in such a manner is not limited to 1. For example, the holding portions may be disposed on the reagent table along a plurality of concentric circles having different radii. In that case, the magnets are concentrically provided to correspond to such a disposition mode. In addition, in the above configuration, the plurality of magnets provided below the reagent table may be replaceably disposed or may be fixedly disposed such that the orientations of the magnetic poles of the magnets are variable. Accordingly, the magnetic force of the magnet or the action mode can be arbitrarily changed, and a desired stirring state corresponding to the reagent can be realized. In addition, in the above configuration, the stirring unit of the related art described above may be further provided. Namely, the automatic analysis apparatus of the invention may include a magnet rotation drive unit that rotationally drives at least one of the plurality of magnets that are provided.

In addition, in the above configuration, the plurality of magnets are disposed such that the fixed orientations of the magnetic poles of the magnets vary along the movement path of the reagent vessels, but such a variation of the orientations of the magnetic poles may be in an irregular variation mode or may be regular. The regular variation of the orientations of the magnetic poles may be realized by, for example, a disposition mode in which the plurality of magnets are disposed such that the orientations of the magnetic poles vary clockwise or counterclockwise along the movement path of the reagent vessels.

In addition, in the above configuration, the controller may control a rotational speed of the reagent table. The magnetic force acting on the stirring bar or the action mode can be changed by changing the rotational speed of the reagent table, and a desired stirring state corresponding to the reagent can be realized.

In addition, in the above configuration, the controller may control a reagent suction operation where the reagent table is rotated to a suction position to suction the reagent from each of the reagent vessels, and a reagent stirring operation where the reagent table is rotated and the stirring bar in each of the reagent vessels is rotated and/or oscillated by the magnetic force from the magnets. In this case, the controller may perform control such that two operations such as the reagent dispensing operation and the reagent stirring operation are separately performed in an analysis operation cycle, or may perform control such that the reagent suction operation is performed in an analysis operation cycle and the reagent stirring operation is performed outside the analysis operation cycle. Examples of the latter case include a case where the table rotation drive unit is controlled such that the reagent stirring operation is continuously or discontinuously performed, for example, in a state where an analysis operation including the reagent suction operation is not performed (for example, in a sleep state, an analysis start preparation state, or the like of the automatic analysis apparatus). When the reagent table is continuously rotated in such a manner, not only homogenizing a reagent composition, but also a secondary effect such as being able to homogenize a reagent temperature distribution in the reagent vessel can be obtained by the stirring of the reagent. In addition, when the magnet is installed below a reagent dispensing position, the magnet is disposed such that a magnetic force acts on the stirring bar to separate the stirring bar from a center portion of a horizontal plane at the bottom portion of the reagent vessel, so that when the reagent is suctioned by a reagent probe, contact between the probe and the stirring bar can be avoided, thereby reducing a dead volume of the reagent.

Effect of the Invention

According to the invention, it is possible to provide the automatic analysis apparatus capable of stirring the reagent without reducing the analysis processing capacity, with a simple configuration.

BRIEF DESCRIPTION OF DRAWINGS

FIG. 3A is a schematic side cross-sectional view of the reagent supply portion, and FIG. 3B is a schematic plan view of a bottom surface forming a magnet holding surface of a reagent chamber; and FIG. 4A FIG. 4B is a schematic plan view of a bottom surface of a reagent chamber including a stirring unit.

MODE(S) FOR CARRYING OUT THE INVENTION

Hereinafter, an embodiment of the invention will be described with reference to the drawings.

Figure 1:
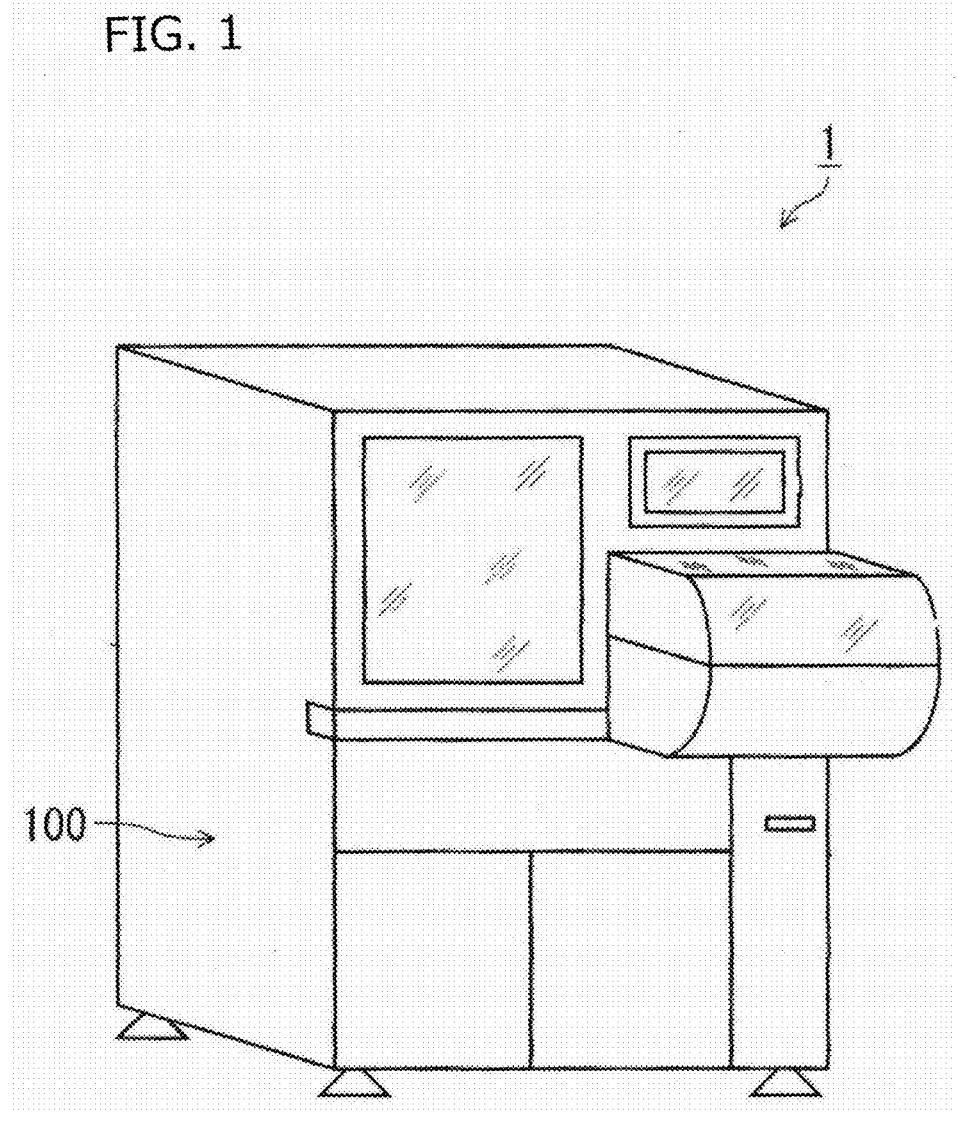
FIG. 1 is an overall schematic exterior view of an automatic analysis apparatus according to one embodiment of the invention.
Figure 2:
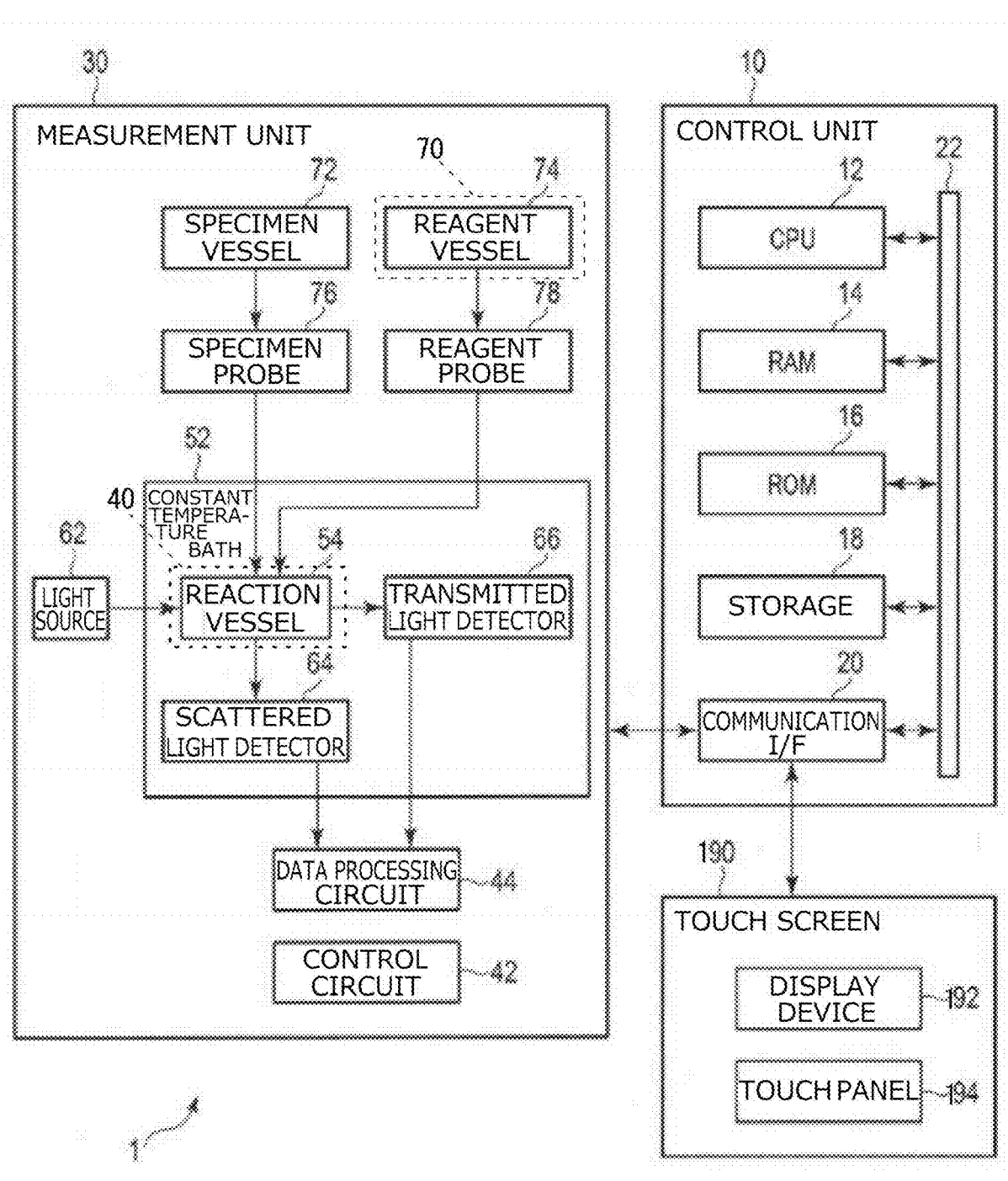
FIG. 2 is a block diagram illustrating a schematic configuration of the automatic analysis apparatus of FIG. 1.

FIG. 1 is an overall schematic exterior view of an automatic analysis apparatus of one embodiment of the invention, and FIG. 2 is a block diagram illustrating a schematic internal configuration of the automatic analysis apparatus of FIG. 1. As illustrated in FIG. 2, an automatic analysis apparatus 1 of the present embodiment includes a reaction portion 40 that holds a reaction vessel 54 into which a specimen such as blood or urine collected from a human is dispensed, and a reagent supply portion 70 that supplies a reagent in a reagent vessel 74 to the reaction vessel 54, and obtains measurement information regarding a predetermined test item by causing the reagent supplied from the reagent supply portion 70 to the reaction vessel 54, to react with the specimen and by measuring a reaction process (by measuring a mixed solution in which the reagent and the specimen are mixed to react with each other).

Specifically, the automatic analysis apparatus 1 of the present embodiment is configured such that a housing 100 forms an outer frame of the automatic analysis apparatus 1 and a specimen processing space is formed in an upper portion inside the housing 100 (refer to FIG. 1).

As clearly illustrated in FIG. 2, the automatic analysis apparatus 1 includes a control unit (controller) 10, a measurement unit 30, and a display and operation unit. In the present embodiment, for example, a touch screen 190 is provided as the display and operation unit.

The control unit 10 controls overall operation of the automatic analysis apparatus 1. The control unit 10 is configured as, for example, a personal computer (PC). The control unit 10 includes a Central Processing Unit (CPU) 12, a Random Access Memory (RAM) 14, a Read Only Memory (ROM) 16, a storage 18, and a communication interface (I/F) 20 that are connected to each other via a bus line 22. The CPU 12 performs various signal processing and the like. The RAM 14 functions as a storage device of the CPU 12. For example, a Dynamic RAM (DRAM), a Static RAM (SRAM), or the like can be used as the RAM 14. The ROM 16 records various boot programs and the like. For example, a Hard Disk Drive (HDD), a Solid State Drive (SSD), or the like can be used as the storage 18. The storage 18 records various information such as programs and parameters to be used by the CPU 12. In addition, the storage 18 records data acquired by the measurement unit 30. The RAM 14 and the storage 18 are not limited to the above configurations and can be replaced with various storage devices. The control unit 10 communicates with an external device, for example, the measurement unit 30 and the touch screen 190 via the communication I/F 20.

The touch screen 190 includes a display device 192 as a display unit and, for example, a touch panel 194 as an operation unit or the like. The display device 192 may include, for example, a liquid crystal display (LCD), an organic EL display, or the like. The display device 192 displays various screens under control of the control unit 10. The screen may include various screens such as a display screen related to a reagent amount, an operation screen of the automatic analysis apparatus 1, a screen illustrating a measurement result, and a screen illustrating an analysis result. The touch panel 194 is provided on the display device 192. The touch panel 194 acquires an input from a user and transmits the acquired input information to the control unit 10.

The control unit 10 may be connected to other devices such as a printer, a handy code reader, and a host computer via the communication I/F 20.

The measurement unit 30 includes a control circuit 42, a data processing circuit 44, a constant temperature bath 52, the reaction vessel 54, a light source 62, a scattered light detector 64, a transmitted light detector 66, a specimen vessel 72, the reagent vessel 74, a specimen probe 76, and a reagent probe 78. In the present embodiment, as one example, the reaction vessel 54, the scattered light detector

64, and the transmitted light detector 66 are provided in the constant temperature bath 52, but the invention is not limited to such a disposition mode.

The control circuit 42 controls operation of each part of the measurement unit 30 based on a command from the control unit 10. Although not illustrated, the control circuit 42 is connected to each of the data processing circuit 44, the constant temperature bath 52, the light source 62, the scattered light detector 64, the transmitted light detector 66, the specimen probe 76, the reagent probe 78, and the like to control operation of each part.

The data processing circuit 44 is connected to the scattered light detector 64 and to the transmitted light detector 66 and acquires a detection result from the scattered light detector 64 and the transmitted light detector 66. The data processing circuit 44 performs various processes on the acquired detection results, and outputs a processing result. The process performed by the data processing circuit 44 can include, for example, an A/D conversion process for converting a format of data output from the scattered light detector 64 and the transmitted light detector 66 into a format that can be processed by the control unit 10.

The control circuit 42 and the data processing circuit 44 can include, for example, a CPU, an Application Specific Integrated Circuit (ASIC), a Field Programmable Gate Array (FPGA), or the like. Each of the control circuit 42 and the data processing circuit 44 may be configured by one integrated circuit or the like, or may be configured by combining a plurality of integrated circuits or the like. Further, the control circuit 42 and the data processing circuit 44 may be configured as one integrated circuit or the like. Operation of the control circuit 42 and the data processing circuit 44 can be performed according to, for example, a program recorded in the storage device or in a recording area in the circuit.

The specimen vessel 72 contains, for example, a specimen obtained from blood collected from a patient. The reagent vessel 74 contains various reagents used for measurement. Any number of the specimen vessels 72 and the reagent vessels 74 may be provided. Since a plurality of types of reagents are normally used for analysis, generally, the number of the reagent vessels 74 is plural. The specimen probe 76 dispenses the specimen contained in the specimen vessel 72, into the reaction vessel 54 under control of the control circuit 42. The reagent probe 78 dispenses the reagent contained in the reagent vessel 74, into the reaction vessel 54 under control of the control circuit 42. Any number of specimen probes 76 and reagent probes 78 may be used.

The constant temperature bath 52 maintains the temperature of the reaction vessel 54 at a predetermined temperature under control of the control circuit 42. A mixed solution in which the specimen dispensed by the specimen probe 76 and the reagent dispensed by the reagent probe 78 are mixed reacts in the reaction vessel 54. Incidentally, any number of reaction vessels 54 may be used.

The light source 62 emits light having a predetermined wavelength under control of the control circuit 42. The light source 62 may be configured to emit light having different wavelengths depending on the measurement condition. Therefore, the light source 62 may have a plurality of light source elements. The light emitted from the light source 62 is guided by, for example, an optical fiber, and the reaction vessel 54 is irradiated with the light. The light with which the reaction vessel 54 is irradiated is partially scattered and partially transmitted depending on a state of a reaction process of the mixed solution in the reaction vessel 54. The scattered light detector 64 detects light scattered by the reaction vessel 54. The transmitted light detector 66 detects light transmitted through the reaction vessel 54. The data processing circuit 44 processes information of a scattered light amount detected by the scattered light detector 64 or processes information of a transmitted light amount detected by the transmitted light detector 66. When the information of the transmitted light amount is processed, the information of the transmitted light amount is converted into an absorbance according to a test item, and then a measured value is computed. Either the scattered light detector 64 or the transmitted light detector 66 may be operated according to a measurement condition. Therefore, the data processing circuit 44 may process either the information of the scattered light amount detected by the scattered light detector 64 or the information of the transmitted light amount detected by the transmitted light detector 66, according to a measurement condition. The data processing circuit 44 transmits the processed data to the control unit 10. Incidentally, the measurement unit 30 illustrated in FIG. 2 includes two detectors, namely, the scattered light detector 64 and the transmitted light detector 66, but may include only one thereof.

The control unit 10 performs various calculations based on the data acquired from the measurement unit 30. The calculation includes a calculation of a reaction amount of the mixed solution, a quantitative calculation of a substance amount or an active value of a substance to be measured in a subject based on the reaction amount, and the like. The data processing circuit 44 may perform some of or all the calculations.

Incidentally, here, a case has been illustrated in which a PC that controls operation of the measurement unit 30 and a PC that performs data calculation and quantitative calculation are the same control unit 10, but the PCs may be separate bodies. In other words, the PC that performs data calculation and quantitative calculation may exist as each.

Next, one example of a reagent stirring configuration that is a characteristic configuration of the automatic analysis apparatus 1 according to one embodiment of the invention will be described with reference to FIG. 3A and FIG. 3B.

Figures 3A, 3B:
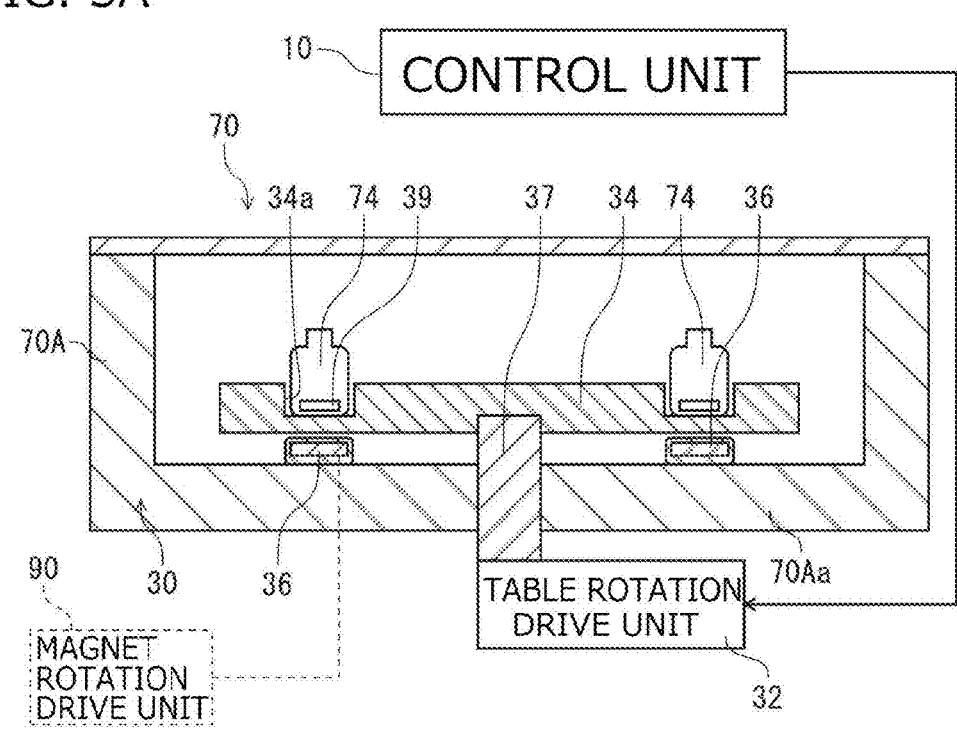
FIG. 3A and FIG. 3B illustrate a reagent supply portion of the automatic analysis apparatus of the invention.

As illustrated in FIG. 3A and FIG. 3B, in the reagent supply portion 70, a reagent table 34 that is rotatable and holds the reagent vessels 74 containing the reagents is located and provided inside a reagent chamber 70A. The reagent table 34 is rotationally driven by a table rotation drive unit 32 including a drive motor, via a rotating shaft 37 coupled to the reagent table 34. In addition, the driving of the table rotation drive unit 32 is controlled by the control unit 10 that is a controller that controls operation of other drive units (not illustrated) of the automatic analysis apparatus 1.

A plurality of holding portions 34a that individually hold the reagent vessels 74 are provided in the reagent table 34, to have, for example, a recessed cross section and to be concentric about a rotation axis of the reagent table 34 at predetermined intervals along a circumferential direction of the reagent table 34. Particularly, in the present embodiment, the holding portions 34a are provided along one circle over an entire circumference of the reagent table 34. In addition, a plurality of magnets 36 are disposed below the reagent table 34, with orientations of magnetic poles of the magnets 36 fixed, along a movement path R of the reagent vessels 74 held by the holding portions 34a and moving on a circumference when the reagent table 34 is rotationally driven. In this case, the magnets 36 are provided on a bottom surface 70Aa forming a magnet holding surface of the reagent chamber 70A, are disposed such that the fixed orientations (indicated by arrows in FIG. 3B) of the magnetic poles of the magnets 36 vary along the movement path R of the reagent vessels 74, and act a magnetic force on a stirring bar 39 disposed in each of the reagent vessels 74 and having magnetism. Particularly, in the present embodiment, the magnets 36 are disposed such that the fixed orientations of the magnetic poles of the magnets 36 vary clockwise (or may vary counterclockwise) along the movement path R of the reagent vessels 74. Specifically, in the present embodiment, the magnets 36 are disposed such that the fixed orientations of the magnetic poles of the magnets 36 vary completely 360° clockwise over half circumference of the movement path R having a circular shape. In other words, the magnets 36 are disposed such that the orientations of the magnetic poles of the magnets 36 vary two turns clockwise over an entire circumference of the movement path R. Furthermore, in this example, the orientations of the magnetic poles of a pair of the magnets 36 located to face each other with a center of the bottom surface 70Aa of the reagent chamber 70A (therefore, a rotation center of the reagent table 34) interposed therebetween are substantially the same. However, the magnets 36 may be disposed such that the orientations of the magnetic poles of the magnets 36 vary two turns counterclockwise over the entire circumference of the movement path R or may be disposed such that the orientations of the magnetic poles of the magnets 36 vary three or more turns or one turn clockwise or counterclockwise over the entire circumference of the movement path R, or/and the magnetic poles may be irregularly oriented without regularity such as being clockwise or counterclockwise.

Incidentally, in the present embodiment, each of the magnets 36 is rotatably and detachably disposed and fixed to the bottom surface 70Aa forming the magnet holding surface of the reagent chamber 70A, the orientations of the magnetic poles of the magnets 36 can be changed (can be positioned at the changed positions), and the magnets 36 can be replaced.

In such a reagent stirring configuration, when the control unit 10 controls the driving of the table rotation drive unit 32 to rotate the reagent table 34 in a timely manner, the reagent vessels 74 pass above the plurality of magnets 36, so that a magnetic force from the magnets 36 acts on the stirring bar 39 in each of the reagent vessels 74 to rotate and/or oscillate the stirring bar 39, thereby stirring the reagent. In this case, the control unit 10 may control the rotational speed of the reagent table 34. The magnetic force acting on the stirring bar 39 or the action mode can be changed by changing the rotational speed of the reagent table 34, and a desired stirring state corresponding to the reagent can be realized.

In addition, in the present embodiment, the control unit 10 can control a reagent suction operation in which the reagent table 34 is rotated to a suction position to suction the reagent from the reagent vessel 74, and a reagent stirring operation in which the reagent table 34 is rotated and the stirring bar 39 in each of the reagent vessels 74 is rotated and/or oscillated by the magnetic force from the magnets 36. In this case, the control unit 10 may perform control such that a reagent dispensing operation also serving as the reagent stirring operation is performed in an analysis operation cycle, may perform control such that two operations such as the reagent dispensing operation and the reagent stirring operation are separately performed in an analysis operation cycle, or may perform control such that the reagent suction operation is performed in an analysis operation cycle and the reagent stirring operation is performed outside the analysis operation cycle. When the reagent stirring operation is performed outside an analysis operation cycle, the control unit 10 may control the table rotation drive unit 32 such that the reagent stirring operation is continuously or discontinuously performed, for example, in a state where an analysis operation including the reagent suction operation is not performed (for example, in a sleep state, an analysis start preparation state, or the like of the automatic analysis apparatus 1). When the reagent table 34 continues to be continuously rotated in such a manner, not only homogenizing a reagent concentration or the like, but also a secondary effect such as being able to homogenize a reagent temperature distribution in the reagent vessel 74 can be obtained by the stirring of the reagent.

Figure 4A:
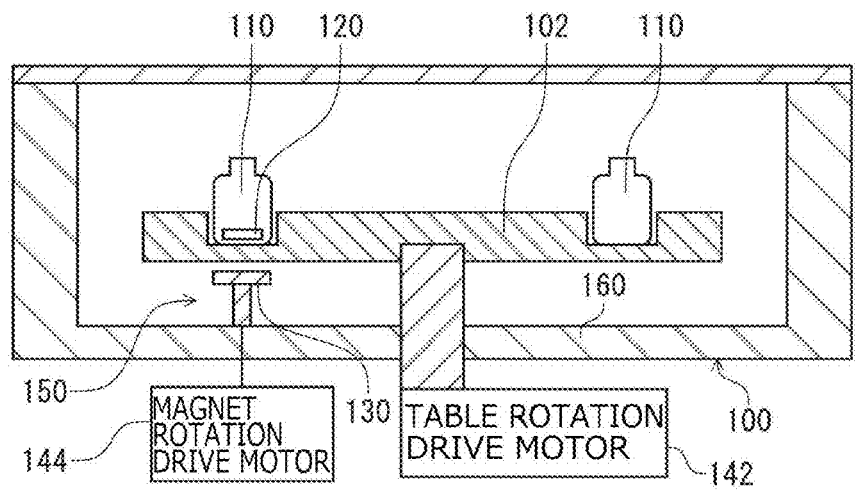
FIG. 4A is a schematic side cross-sectional view of the reagent supply portion.
Figure 4B:
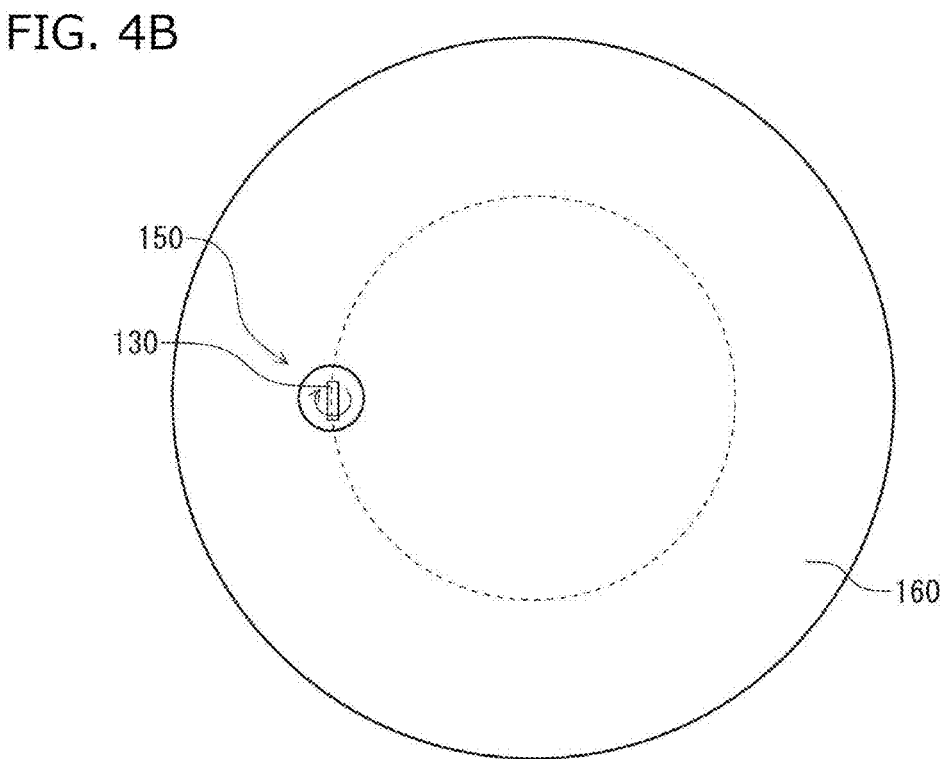
FIG. 4B illustrates a reagent supply portion in the related art.

As described above, according to the automatic analysis apparatus 1 of the present embodiment, the plurality of magnets 36 are disposed below the reagent table 34 along the movement path R of the reagent vessels 74 moving on the circumference when the reagent table 34 is rotationally driven, such that the orientations of the magnetic poles of the magnets 36 vary along the movement path R, and the reagent vessels 74 pass above the plurality of magnets 36 when the reagent table 34 is rotationally driven, so that the stirring bar 39 in each of the reagent vessels 74 is rotated and/or oscillated by a magnetic force, to stir the reagent. Therefore, for example, the reagent can also be stirred at the same time as the rotation of the reagent table 34 performed for the normal reagent dispensing operation. For this reason, it is not necessary to separately provide the stirring unit including the rotation mechanism that rotates the magnet as in the related art described above in relation to FIG. 4A and FIG. 4B, and in order to stir the reagent, it is also not necessary to rotate the reagent table to position the reagent vessel above the stirring unit. Therefore, since the reagent can be stirred with a simple configuration, and the time for stirring does not need to be secured separately from the time for the reagent dispensing operation, the analysis operation cycle time can be shortened and the analysis processing capacity can be improved.

Incidentally, the invention is not limited to the above-described embodiment and can be modified and implemented in various modes without departing from the scope of the invention. For example, in the invention, the disposition mode of the reagent vessel holding portions on the reagent table and the disposition mode of the magnets corresponding thereto can be arbitrarily set. For example, in the above-described embodiment, the reagent vessel holding portions are provided over the entire circumference of the reagent table, but the reagent vessel holding portions do not need to be provided over the entire circumference of the reagent table, and the fixed orientations of the magnetic poles of the magnets may be in any orientation mode as long as the fixed orientations are disposed to vary along the movement path of the reagent vessels. In addition, the rotation drive mode of the reagent table can be arbitrarily set. For example, the rotational direction of the reagent table is not limited to one direction, and stirring can also be performed by a combination of forward rotation and reverse rotation. In addition, as illustrated by a chain line in FIG. 3A and FIG. 3B, a magnet rotation drive unit 90 that rotationally drives at least one of the plurality of magnets may be optionally provided. In such a manner, the reagent stirring configuration of the invention and the stirring unit of the related art can also be used in combination. In addition, some or all of the above-described embodiments may be combined without departing from the scope of the invention, or a part of the configurations may be omitted from one of the above-described embodiments.

What is claimed is:

1. An automatic mixing apparatus configured to cause a reagent to react with a specimen, the automatic mixing apparatus comprising:
   a reaction vessel where the specimen is dispensed;
   a reagent supply portion configured to supply the reagent, the reagent supply portion including:
      a reagent table configured to be rotationally driven by a drive motor, and further configured to hold reagent vessels,
      the reagent vessels, each containing a reagent, and
      a table rotation drive motor to rotationally drive the reagent table; and
   a controller configured to control operation of the table rotation drive motor, wherein
   a plurality of recesses individually holding the reagent vessels are provided in the reagent table at predetermined intervals along a circumference of the reagent table so as to be concentric about a rotation axis of the reagent table,
   a plurality of magnets are disposed below the reagent table along a movement path of the reagent vessels held by the plurality of recesses and moving along the circumference in response to the reagent table being rotationally driven,
   the plurality of magnets are disposed such that an orientation of a magnetic pole of each of the plurality of magnets varies clockwise or counterclockwise along the movement path of the reagent vessels along the circumference in an increment less than 180 degrees relative to an adjacent magnet of the plurality of magnets, and provide a magnetic force, and
   a stirring bar having magnetism disposed in each of the reagent vessels is configured to, in response to the reagent table being rotated by the table rotation drive motor and the reagent vessels passing above the plurality of magnets, be rotated about an axis parallel to the rotation axis of the reagent table and perpendicular to the circumference of the reagent table by the magnetic force of the plurality of magnets, to stir the reagent.

2. The automatic mixing apparatus according to claim 1, wherein
   the controller is configured to control a rotational speed of the reagent table.

3. The automatic mixing apparatus according to claim 1, wherein
   the controller is configured to control
      a reagent suction operation where the reagent table is rotated to a suction position to suction the reagent from each of the reagent vessels, and
      a reagent stirring operation where the reagent table is rotated and the stirring bar disposed in each of the reagent vessels is rotated by the magnetic force from the plurality of magnets.

4. The automatic mixing apparatus according to claim 2, wherein
   the controller is configured to control
      a reagent suction operation where the reagent table is rotated to a suction position to suction the reagent from each of the reagent vessels, and
      a reagent stirring operation where the reagent table is rotated and the stirring bar disposed in each of the reagent vessels is rotated by the magnetic force from the plurality of magnets.

5. The automatic mixing apparatus according to claim 3, wherein the controller is configured to control the table rotation drive motor to continuously or discontinuously perform the reagent stirring operation.

6. The automatic mixing apparatus according to claim 4, wherein the controller is configured to control the table rotation drive motor to continuously or discontinuously perform the reagent stirring operation.

7. The automatic mixing apparatus according to claim 1, wherein the plurality of magnets are detachably disposed to vary the orientation of each magnetic pole of the plurality of magnets.

8. The automatic mixing apparatus according to claim 2, wherein the plurality of magnets are detachably disposed to vary the orientation of each magnetic pole of the plurality of magnets.

9. The automatic mixing apparatus according to claim 1, wherein the plurality of magnets are fixedly disposed.

10. The automatic mixing apparatus according to claim 1, further comprising:

a magnet rotation drive unit to rotationally drive at least one of the plurality of magnets.

* * * * *